US009563792B2

(12) United States Patent
Allen et al.

(10) Patent No.: US 9,563,792 B2
(45) Date of Patent: *Feb. 7, 2017

(54) REMOTE CONTROL OF POWERING OF ELECTRICAL APPLIANCES

(71) Applicant: INTERNATIONAL BUSINESS MACHINES CORPORATION, Armonk, NY (US)

(72) Inventors: James Allen, Hursley Park (GB); Matthew Deadman, Bristol (GB); Sam Marland, Gwynedd (GB); Antony O'Neill, London (GB)

(73) Assignee: International Business Machines Corporation, Armonk, NY (US)

(*) Notice: Subject to any disclaimer, the term of this patent is extended or adjusted under 35 U.S.C. 154(b) by 113 days.

This patent is subject to a terminal disclaimer.

(21) Appl. No.: 14/090,316

(22) Filed: Nov. 26, 2013

(65) Prior Publication Data

US 2014/0159864 A1 Jun. 12, 2014

(30) Foreign Application Priority Data

Nov. 29, 2012 (GB) .................................. 1221515.8

(51) Int. Cl.
*G08C 17/02* (2006.01)
*G06K 7/10* (2006.01)
(Continued)

(52) U.S. Cl.
CPC ........... *G06K 7/10009* (2013.01); *G08C 17/02* (2013.01); *H04L 12/2642* (2013.01);
(Continued)

(58) Field of Classification Search
CPC ...... Y04S 20/242; Y04S 20/16; Y02B 90/226;
Y02B 70/3266; G06K 7/10009; G08C 17/02; H04L 12/2642; H04L 12/2809; H04L 12/2816
(Continued)

(56) References Cited

U.S. PATENT DOCUMENTS 5,826,175 A * 10/1998 Schmidt ............. G06K 19/0723
340/10.3
7,295,113 B2 11/2007 Haller
(Continued)

FOREIGN PATENT DOCUMENTS

JP 2006244818 A 9/2006
JP 2011061972 A 3/2011
(Continued)

OTHER PUBLICATIONS

Application No. GB122151.8, Intellectual Property Office, Search Report Apr. 15, 2013.
(Continued)

*Primary Examiner* — Thomas Alunkal
(74) *Attorney, Agent, or Firm* — Yudell Isidore PLLC

(57) ABSTRACT

A system and computer program product are provided for remotely controlling a supply of power to a plurality of electrical appliances. In response to attaching a plug of a first electrical appliance of a plurality of electrical appliances to a first socket of the one or more sockets connected to a main power supply, a control system activates a transceiver at a first of the first socket and the plug; stimulates, via the transceiver, a tag at a second of the first socket and the plug to determine a unique identifier of the tag. The control system receives the unique identifier of the tag from the transceiver and uses the unique identifier to activate/deactivate the transceiver which connects/disconnects the main power supply from the first electrical appliance.

16 Claims, 9 Drawing Sheets

(51) Int. Cl.
*H04L 12/26* (2006.01)
*H04L 12/28* (2006.01)

(52) U.S. Cl.
CPC ...... *H04L 12/2809* (2013.01); *H04L 12/2816* (2013.01); *Y02B 70/3266* (2013.01); *Y02B 90/226* (2013.01); *Y04S 20/16* (2013.01); *Y04S 20/242* (2013.01)

(58) Field of Classification Search
USPC ............... 340/12.29, 5.61, 656; 307/140
See application file for complete search history.

(56) References Cited

U.S. PATENT DOCUMENTS

| | | | |
|---|---|---|---|
| 7,660,890 B2 | 2/2010 | Banerjee | |
| 7,964,989 B1 | 6/2011 | Puschnigg et al. | |
| 8,442,792 B1* | 5/2013 | Elberbaum | G06F 19/00 |
| | | | 702/107 |
| 8,461,725 B1* | 6/2013 | Stubbs | H01H 9/54 |
| | | | 307/140 |
| 2004/0065733 A1* | 4/2004 | Fukuoka | G06K 7/0008 |
| | | | 235/435 |
| 2004/0113790 A1* | 6/2004 | Hamel | A61F 2/4657 |
| | | | 340/572.1 |
| 2005/0184856 A1* | 8/2005 | Pourchot | H04M 1/67 |
| | | | 340/5.61 |
| 2005/0237198 A1* | 10/2005 | Waldner | G06K 19/0707 |
| | | | 340/572.7 |
| 2006/0072271 A1* | 4/2006 | Jones | G06K 19/07758 |
| | | | 361/93.1 |
| 2006/0152338 A1 | 7/2006 | Hsu | |
| 2007/0149013 A1* | 6/2007 | Eastham | H01R 13/7036 |
| | | | 439/140 |
| 2008/0186178 A1 | 8/2008 | Tuttle | |
| 2010/0090806 A1 | 4/2010 | Schork | |
| 2011/0289231 A1 | 11/2011 | Falk | |
| 2012/0150359 A1* | 6/2012 | Westergaard | H02J 3/14 |
| | | | 700/291 |
| 2014/0159864 A1 | 6/2014 | Allen | |
| 2014/0248802 A1* | 9/2014 | Hieda | H04L 12/2818 |
| | | | 439/620.01 |

FOREIGN PATENT DOCUMENTS

| | | |
|---|---|---|
| KR | 100927337 B1 | 11/2009 |
| WO | 2007072581 A1 | 6/2007 |

OTHER PUBLICATIONS

"Home Smart Power Management System," http://www.sysmaster.com/products/home_smartpower.php.

Geere, "Sony plugs RFID chips into smart power sockets,"http://www.wired.co.uk/news/archive/2012-02/16/sony-power-sockets, Feb. 16, 2012.

Pulvermacher, "Finding the Right RFID Tag," http://www.isa.org/InTechTemplate.cfm?ContentID=83049&template=/ContentManagement/ContentDisplay.cfm, Jul./Aug. 2010.

Kortvedt et al., "Eavesdropping Near Field Communication," The Norwegian Information Security Conference (NISK) 2009.

Alunkal, Thomas D., Final Office Action, U.S. Appl. No. 14/472,301 The United States Patent and Trademark Office, Jan. 29, 2016.

Alunkal, Thomas D., Non-Final Office Action, U.S Appl. No. 14/472,301, The United States Patent and Trademark Office, Jun. 14, 2016.

Alunkal, Thomas D., Advisory Action, U.S. Appl. No. 14/472,301, The United States Patent and Trademark Office, May 20, 2016.

* cited by examiner

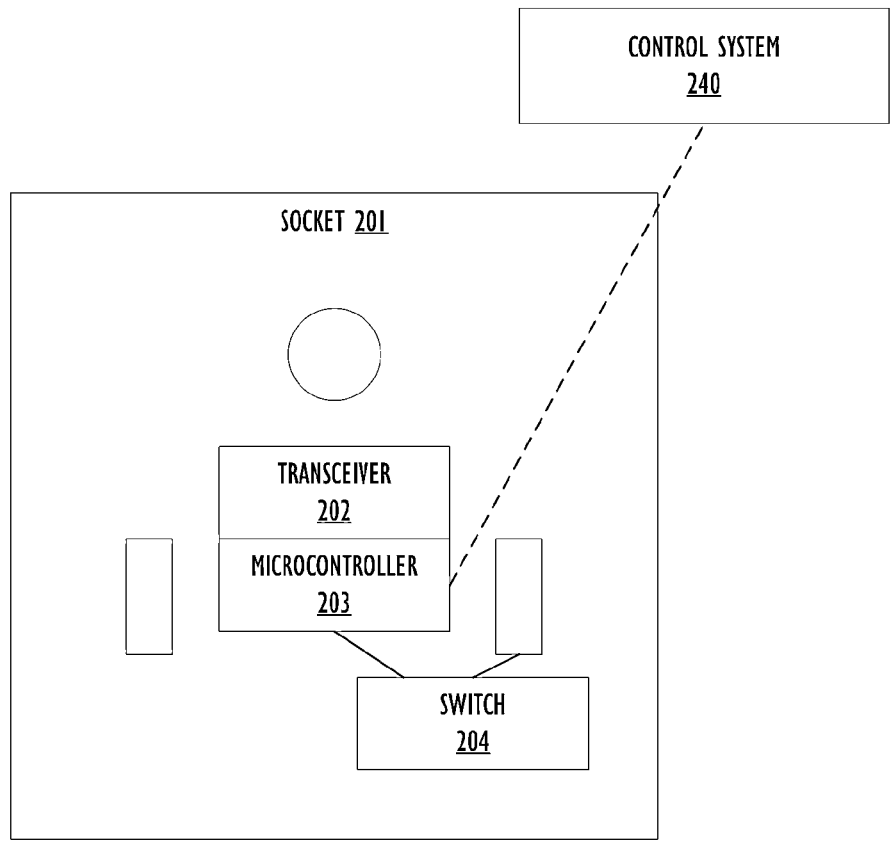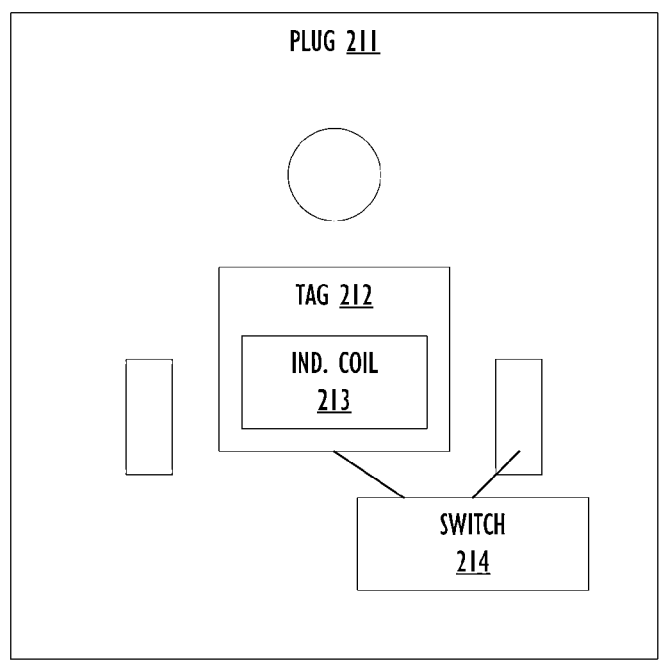
Fig. 2

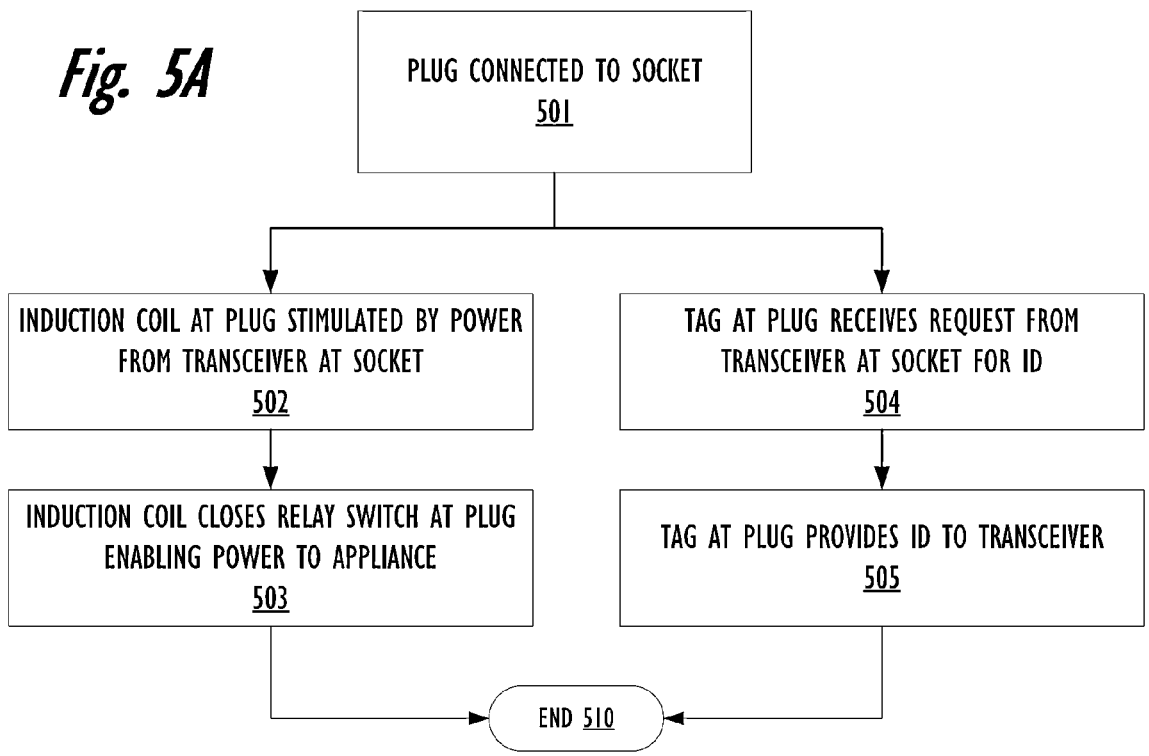
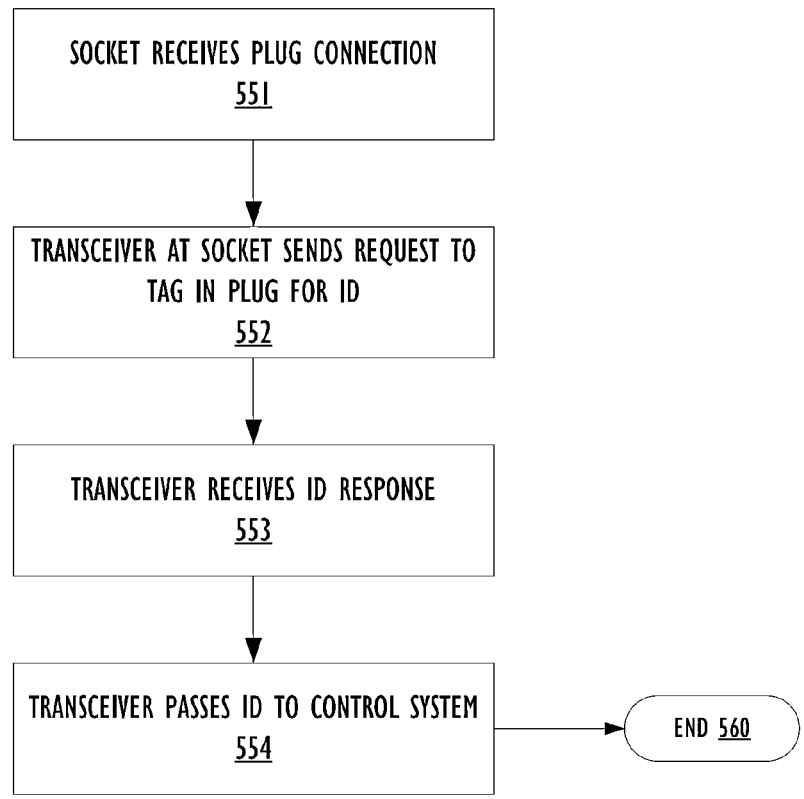

US 9,563,792 B2

REMOTE CONTROL OF POWERING OF ELECTRICAL APPLIANCES

PRIORITY CLAIM

The present application claims benefit of priority from Great Britain Patent Application 1221515.8, filed on Nov. 29, 2012. The content of that application is incorporated by reference herein.

BACKGROUND

1. Technical Field

The present disclosure generally relates to the remote control of electrical appliances. More specifically, the present disclosure relates to remotely identifying and controlling powering of electrical appliances.

2. Description of the Related Art

In many households and commercial buildings, multiple appliances may be plugged into power outlets, some of which may not require persistent power at all times. Power consumption is a major cost of households and enterprises, and therefore it is necessary to make sure appliances are switched off when not in use. However, it is time consuming to manually walk around buildings, especially large structures, and switch off some or all appliances. Additionally, in some cases, a power supply to an appliance may not be easily or readily accessible to switch off manually.

BRIEF SUMMARY

According to one aspect of the present disclosure there are provided a system and computer program product that provides wireless automation and control of sockets connected to a main power supply in order to selectively turn appliances connected to the sockets on or off, thus providing energy savings in a given time period. An appliance is connectable to a power supply via a plug and socket which interconnects the appliance to the main power supply. One of the socket and the plug includes a transceiver that is powered by the main supply. The other of the socket and the plug includes a tag that is stimulated by a powered transceiver when the transceiver is in close proximity. While the tag is stimulated, the tag allows current to flow to the appliance. The tag also has a unique identifier which is interrogated by the transceiver. A control system receives the unique identifier of a tag. Using the unique identifier, the control system is able to control power to the transceiver in order to control the activation or deactivation of the plug at the socket, which controls whether power is supplied from the main power supply to the connected appliance. The tag may include an inductor that when stimulated by the transceiver closes a relay switch. Additionally, the socket may further include a microcontroller for receiving instructions from the control system. The microcontroller may be further connected to a power control, which is operated by the microcontroller to power on/off the transceiver based on instructions from the control system. The microcontroller and the transceiver may be provided in a series circuit which is wired in parallel to live and neutral wires of the socket. The microcontroller may communicate with the control system via a wireless connection.

BRIEF DESCRIPTION OF THE DRAWINGS

The present disclosure can be better understood by referring to the following description when read in conjunction with the accompanying drawings, in which same or similar reference numerals are used to denote same or similar components. The drawings, together with the following detailed description, are included in the specification and form part thereof, and used to further illustrate by way of example embodiments of the present disclosure and explain principles and advantages of the present disclosure.

FIG. 2 is a block diagram of an exemplary plug and socket of the system according to an embodiment of the present disclosure;

FIG. 5A is a flow diagram of a method performed by a plug when a plug is connected to a socket according to an embodiment of the present disclosure;

FIG. 5B is a flow diagram of a method performed by a socket when a plug is connected to the socket according to an embodiment of the present disclosure;

DETAILED DESCRIPTION OF AN ILLUSTRATIVE EMBODIMENT

Figure 1:
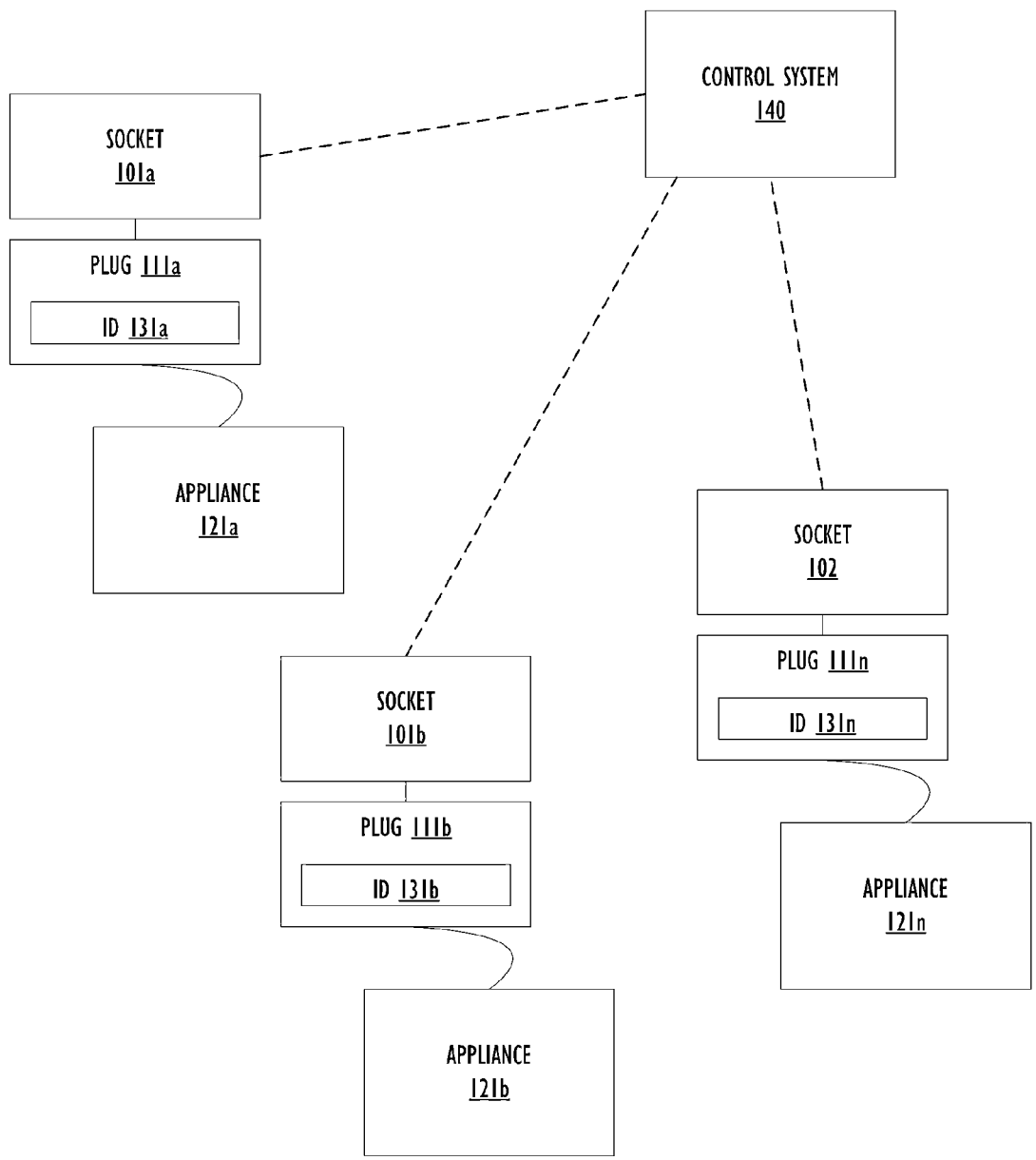
FIG. 1 is a block diagram of a system according to an embodiment of the present disclosure.

Described herein is a system, method, and computer program product for remotely identifying and remotely controlling powering of electrical appliances in a household environment or in a commercial building or buildings. Each electrical appliance is individually detected and monitored in each individual socket.

In one embodiment, in response to attaching a plug of a first electrical appliance of the plurality of electrical appliances to a first socket of the one or more sockets, a control system: activates a transceiver at a first of the first socket and the plug of the first electrical appliance; stimulates, via the transceiver, a tag at a second of the first socket and the plug of the first electrical appliance, where the tag is in close proximity to the transceiver; and interrogates the tag, via the transceiver, to determine a unique identifier of the tag, where the unique identifier enables the control system to control whether power is applied to the transceiver. The control system may then receive, from the transceiver, the unique identifier of the tag. In response to the control system receiving an instruction to disconnect power to the first electrical appliance, the control system deactivates the transceiver. The deactivation of the transceiver deactivates the plug of the first electrical appliance at the first socket and disconnects the main power supply from the first electrical appliance. In response to the control system receiving an instruction to connect power to the first electrical appliance, the control system activates the transceiver. Activation of the transceiver activates the plug of the first electrical appliance at the first socket and interconnects the main power supply to the first electrical appliance.

In one embodiment, the transceiver is powered by the main supply and the plug is powered at the first socket only while the transceiver is active and the plug is attached to the first socket. The tag allows current to flow through the plug to the first electrical appliance while the tag is stimulated.

In one embodiment, the tag includes an inductor that is coupled to a first relay switch and the first relay switch is wired in series with and located in between the first electrical appliance and the main power supply. The inductor holds the first relay switch closed while the tag is being stimulated by the transceiver.

In one embodiment, the first socket comprises a microcontroller that receives instructions from the control system. The microcontroller is coupled to a second relay switch and may receive instructions from the control system to provide or disconnect power to the transceiver by closing or opening of the second relay switch. The microcontroller and the transceiver are connected in series and are both wired parallel to a live wire and a neutral wire of the first socket. The microcontroller may be communicatively coupled to the control system via a wireless connection. Additionally, the control system may further comprise a web portal having a network connection to each of the one or more sockets.

In one embodiment, the transceiver and the tag are radio-frequency identification (RFID) devices. In another embodiment, the transceiver and the tag are near field communication (NFC) devices.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the disclosure. However, it will be understood by those skilled in the art that the present disclosure may be practiced without these specific details. In other instances, well-known methods, procedures, and components have not been described in detail so as not to obscure the present disclosure.

Referring to FIG. 1, there is illustrated a block diagram of a system according to an embodiment of the present disclosure. System 100 may include multiple sockets 101*a-n* for receiving plugs 111*a-n* of appliances 121*a-n*. Each plug 111*a-n* may have a unique identification 131*a-n*. A control system 140 may be provided in communication with the sockets 101*a-n* via a network or other means. When a plug 111*a-n* of an appliance 121*a-n* is plugged into a socket 101*a-n*, the power from the socket 101*a-n* powers the transmission of the unique identification 131*a-n* of the plug 111*a-n* to the control system 140 and enables control of the power to the plug 111*a-n*.

In one embodiment, each socket in the system may contain a transceiver embedded in the socket, powered off of the main supply with a series of capacitors and resistors. Inside the plug there is a tag which has its own unique identifier. This embodiment is described in detail in the description that follows.

In another embodiment, each socket may contain a tag and a plug may include the transceiver. For example, a socket may, by default, be powered on such that when a plug is inserted into the socket, a transceiver in the plug would be automatically powered, which in turn activates the tag in the socket.

In one embodiment, control system 140 includes a web portal for identifying and controlling appliances 121*a-n*. A network connection, which may be either a wireless or physical network connection, may be supplied to control system 140 via a local area network (LAN). In one embodiment, the network connection is facilitated via a power line communication which uses traditional electrical wiring of a building/dwelling to enable network transmission, thus avoiding a separate network connection/cable.

In one embodiment, the socket may be provided as an extension lead and the powering of the socket may control the peripherals. If two or more plugs are inserted in close proximity to a socket, for example, using a multi-plug adaptor, then power to the two or more plugs may be controlled together via a transceiver of the socket.

Referring now to FIG. 2, there is depicted a block diagram of an exemplary plug and socket of the system according to an embodiment of the present disclosure. As illustrated by FIG. 2, there is shown an embodiment of the described system 200 having a single socket 201 and plug 211 (both shown with a traditional US three conductor arrangement) and a control system 240. Socket 201 may include a transceiver or reader 202 and the plug 211 may include a corresponding tag 212. For example, transceiver 202 and tag 212 may be in the form of radio-frequency identification (RFID) devices or near field communication (NFC) devices. Tag 212 may induce electricity from transceiver 202 and may also have a unique identifier.

Socket 201 may include a microcontroller 203 for communication with control system 240 via a network communication. Socket 201 may also include a switch 204, for example, in the form of a relay switch, which may be operated/controlled by microcontroller 203 to switch on/off power to the transceiver 202.

Plug 211 may include tag 212 with an induction coil 213 powered by transceiver 202 of the socket 201 when the transceiver is in proximity to the plug 211. When powered, Induction coil 213 may close a switch 214, for example, in the form of a relay switch, to switch on/off power to the appliance connected to plug 211.

Transceiver 202 and tag 212 may be radio-frequency identification (RFID) devices which use a wireless non-contact system that uses radio-frequency electromagnetic fields to transfer data from tag 212 to transceiver 202 for identification. Transceiver 202 (also referred to as an interrogator or reader) sends a signal to tag 212 and reads its response. Transceiver 202 may also transmit observations to a computer system running RFID software or middleware. Tag 212 may also electronically store information in a non-volatile memory.

RFID devices use radio frequency electromagnetic signals to transfer data. RFID tags contain at least two parts: an antenna for receiving and transmitting the signal, and an integrated circuit for storing and processing information, modulating and demodulating a radio-frequency signal, collecting DC power from the incident reader signal, and performing any other specialized functions. RFID tags may be either passive, active, or battery-assisted passive. An active tag has an on-board battery and periodically transmits its ID signal. A battery-assisted passive (BAP) has a small battery on board and is activated when in the presence of a RFID reader. A passive tag is typically smaller than an active tag or a BAP tag and has no battery. Instead a passive tag includes a radio-frequency electromagnetic field coil. When a passive tag is read, radio energy of an electromagnetic field transmitted by the reader is used as an energy source to power the tag in order for it to be read. Thus, a passive tag and a transceiver must be sufficiently proximate in order for a RF field to be strong enough to transfer sufficient power to the tag.

In one embodiment, tag 212 and transceiver 202 may be near field communication (NFC) devices which establish radio communication with each other by bringing them into close proximity. NFC devices have the added advantage of sending encrypted data.

In the embodiments where tag 212 and transceiver 202 are NFC devices or RFID devices, a passive tag uses induction to respond to a request for data by a transceiver. The induction is used to power a relay embedded in the plug. When this relay is activated, a switch is closed within the plug, which connects a live pin of the plug to a live wire connected to the appliance. Additionally, powering a passive tag not only allows power to reach a connected appliance, but also enables the tag to respond to the transceiver with its identity. This identity can then be transmitted to a control system which enables the control system to remotely control power supplied to the appliance. In one embodiment, power from the tag may be further amplified.

NFC devices may further include an electromagnetic induction coil for powering a transceiver in close proximity. The amount of power induced by the induction coil depends on the amount of turns in the induction coil and the distance from the transceiver. To ensure the highest possible power rate, an induction coil utilizes a high density of turns and is located in close proximity to the transceiver. Any material surrounding tag 212 and transceiver 202 may potentially reduce the strength of the signal being induced, and thus is preferably kept to a minimum. In one embodiment, only a thin piece of plastic separates the tag 212 and transceiver 202 when in use.

Figure 3:
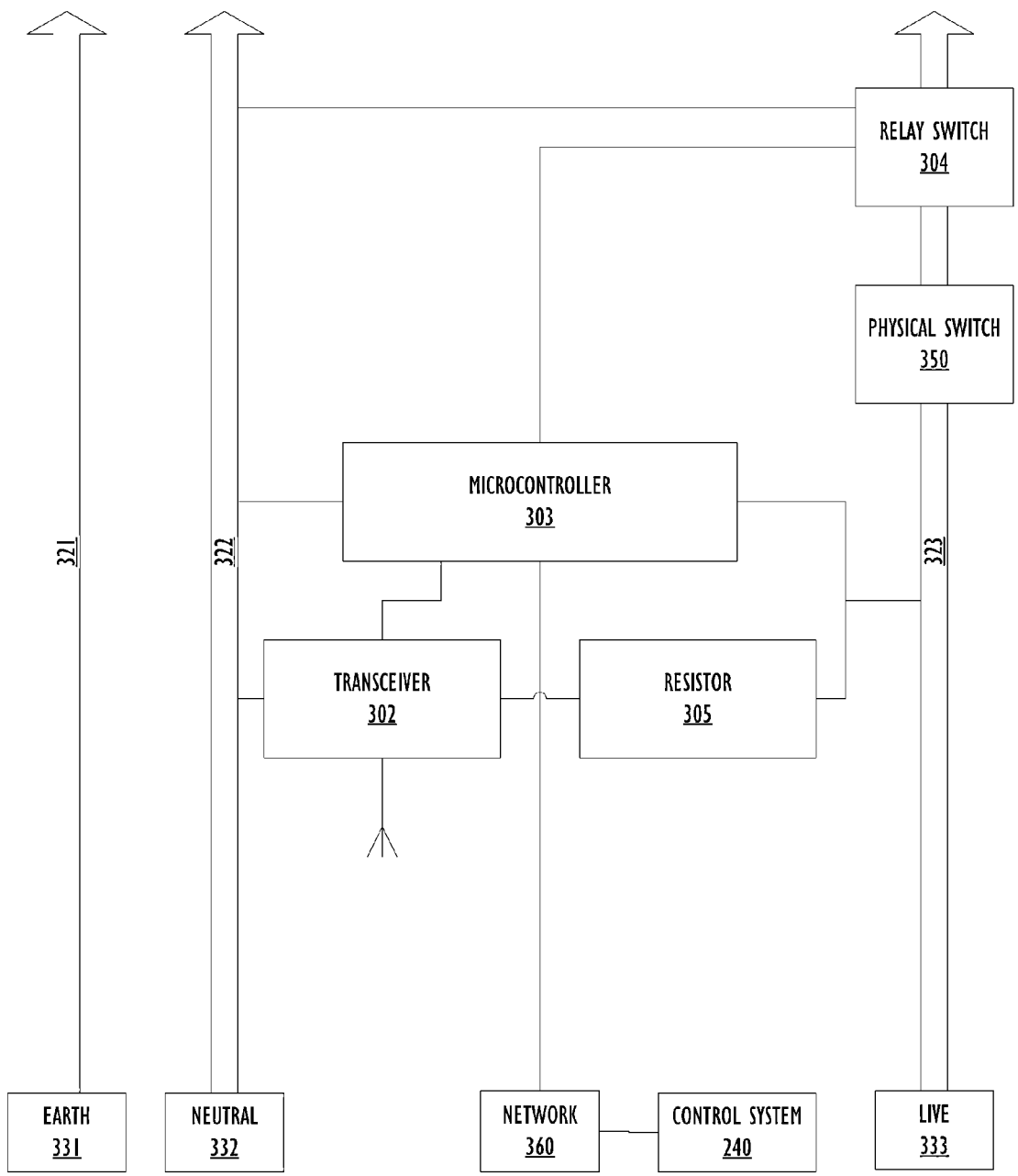
FIG. 3 is a circuit diagram of a socket according to an embodiment of the present disclosure.

Referring now to FIG. 3, there is depicted a circuit diagram of a socket according to an embodiment of the present disclosure. Socket 301 comprises earth wire 321, neutral wire 322, and live wire 323 which run to respective socket receiver earth contact 331, neutral contact 332, and live contact 333 for a plug to a power source. In another embodiment, there may be only neutral wire 322 and live wire 323, and earth wire 321 is not provided.

Microcontroller 303 of socket 301 communicates with control system 240, for example, via a network 360. In one embodiment, microcontroller 303 may be in the form of an Arduino™, which is an open-source single-board microcontroller using a standard programming language compiler having a processor and on-board input/output support. Microcontroller 303 and a transceiver 302 may be provided in a series circuit with resistor 305 wired in parallel to the live wire 323 and neutral wire 322. Thus, microcontroller 303 and the transceiver 302 may be continuously powered as long as live wire 323 is active.

Socket 301 may further include a physical switch 350 in the path of live wire 323 which allows manual on/off switching of power for socket 301. In addition, socket 301 may have a relay switch 304 in the path of live wire 323 which is controlled by microcontroller 303 to enable remote on/off switching of power at socket 301.

Figure 4:
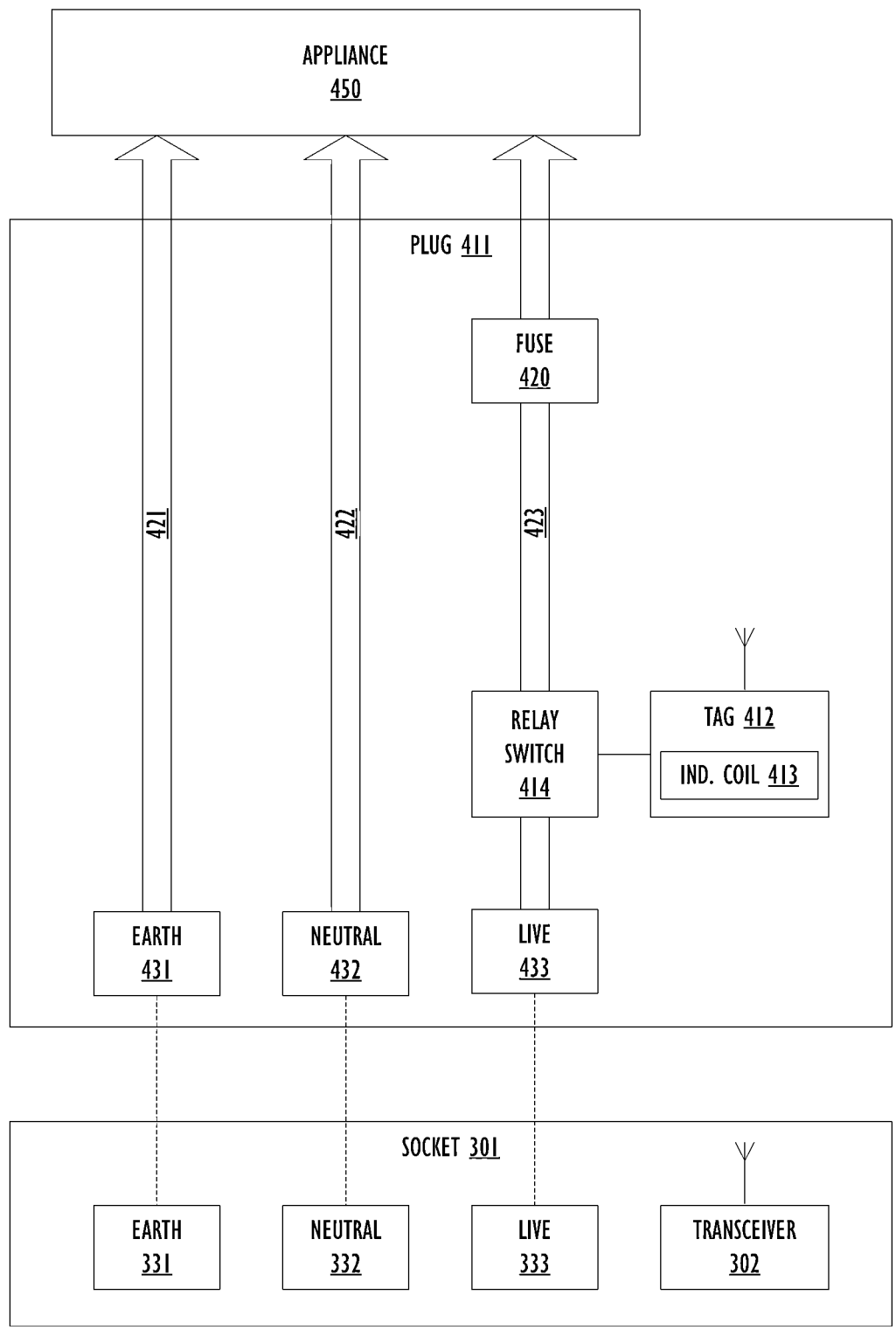
FIG. 4 is a circuit diagram of a plug according to an embodiment of the present disclosure.

Referring now to FIG. 4, there is depicted a circuit diagram of a plug according to an embodiment of the present disclosure. Plug 411 includes earth wire 421, neutral wire 422, and live wire 423 which run from respective earth plug contact 431, neutral plug contact 432, and live plug contact 433. When in use, these three contacts connect with the respective socket receiver contacts (earth contact 331, neutral contact 332, and live contact 333) illustrate in FIG. 3 to power appliance 450. In some embodiments, earth plug contact 421 may not be provided. Plug 411 may also include tag 412. Tag 412 has a unique identifier and includes induction coil 413 which powers tag 412 when power is induced via transceiver 302 of socket 301 of FIG. 3 being in close proximity to plug 411. Relay switch 414 is closed when the induction coil 413 receives power, thus providing power to appliance 450. In one embodiment, plug 411 may further include fuse 420 in live wire 423.

Referring now to FIG. 5A, there is illustrated a flow diagram of a method that is implemented when a plug is connected to a socket, according to an embodiment of the present disclosure. At step 500 a plug is connected to a socket. At step 502, an induction coil of a tag at the plug receives and is stimulated by power of a transceiver at the socket. At step 503, the induction coil may close a relay switch at the plug, which connects power at the socket with an appliance attached to the plug, thus enabling power to be provided to the appliance.

Simultaneously, the tag at the plug receives a request from a transceiver at the socket to provide identifier information (step 504). The tag then provides/returns the requested identifier information, which contains an identification of the appliance that is being powered by the plug (step 506). The process then terminates at step 510.

Referring now to FIG. 5B, there is illustrated a flow diagram of a method that is carried out at a socket when a plug is connected to the socket, according to an embodiment of the present disclosure. At step 551 a socket is connected to a plug. At step 552 a transceiver at the socket sends a request for identifier information of an appliance being powered to a tag at the plug. At step 553, transceiver receives an identifier containing the requested identifier information from the tag. The transceiver then passes the identifier information to a control system (step 554) which indicates to the control system that the plug is being powered and is associated with the identifier. The process then terminates at step 560.

Figure 6A:
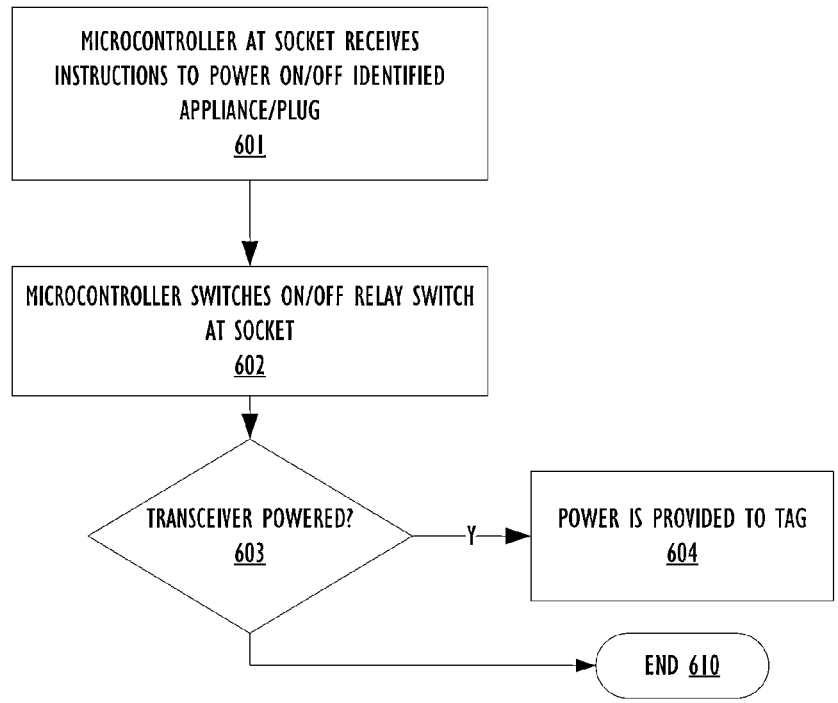
FIG. 6A is a flow diagram of a method performed by a microcontroller at a socket to control power provided to a plug in close proximity according to an embodiment of the present disclosure.

Referring now to FIG. 6A, there is illustrated a flow diagram of a method carried out by a microcontroller at a socket to control power provided to a plug in close proximity, according to an embodiment of the present disclosure. At step 601, a microcontroller at a socket receives instructions from a control system to power on/off an appliance, identified by the unique identifier in a tag within the plug. In response to receiving the instructions, the microcontroller switches closes/opens a relay switch at the socket, which in turn powers on/off a transceiver at the socket (step 602). If the transceiver does not have power, no power is sent by the receiver to the tag in the plug, and the process terminates at step 610. Conversely, if the transceiver is powered, power is sent to the tag in the plug (step 604).

Figure 6B:
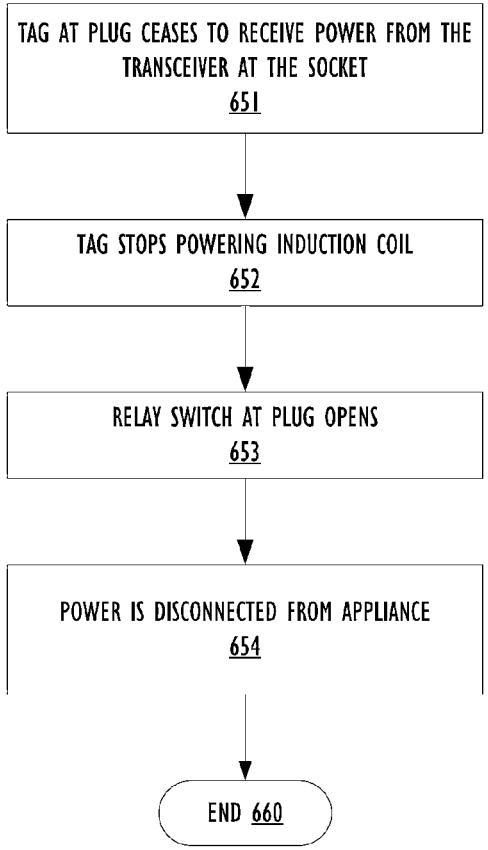
FIG. 6B is a flow diagram of a method performed by a tag of a plug that ceases being powered by a transceiver of a socket in close proximity according to an embodiment of the present disclosure.

Referring now to FIG. 6B, there is illustrated a flow diagram of a method carried out by a tag of a plug that ceases being powered by a transceiver of a socket in close proximity, according to an embodiment of the present disclosure. At step 651, the tag at the plug ceases to receive power from the transceiver at the socket. In response to the tag losing power from the transceiver, the tag is no longer able to provide power to the induction coil, which stops powering of the induction coil (step 652). Loss of power at the induction coil causes the relay switch in the live wire of the plug to open (step 653). The power is thus disconnected from the appliance (step 654) until such time that the tag again receives power from a transceiver in close proximity, as described in FIG. 5A. The process terminates at step 660.

Figure 7:
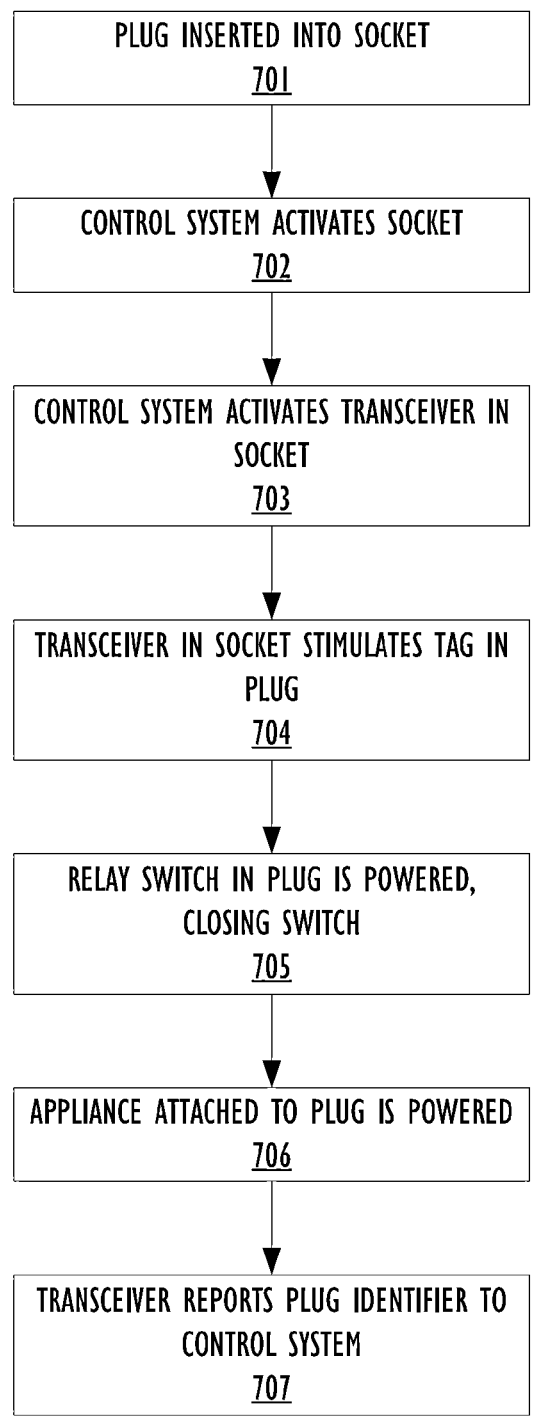
FIG. 7 is a flow diagram of a method for powering an appliance according to an embodiment of the present disclosure.

Referring now to FIG. 7, there is illustrated a flow diagram of a method for powering an appliance according to an embodiment of the present disclosure. At step 701 a plug is inserted into a socket. The socket is then activated via a control system (step 702). At step 703 the control system activates a transceiver in the socket, which in turn causes the transceiver in the socket to stimulate a tag within the plug (step 704). In response to the tag being stimulated, an inductor coil is powered by the tag, which closes the relay switch (step 705). This enables power to flow from the socket through the plug to the appliance (step 706). At step 707 the transceiver reports the plug identifier to the control system to facilitate remote power management of the appliance via the socket.

Figure 8:
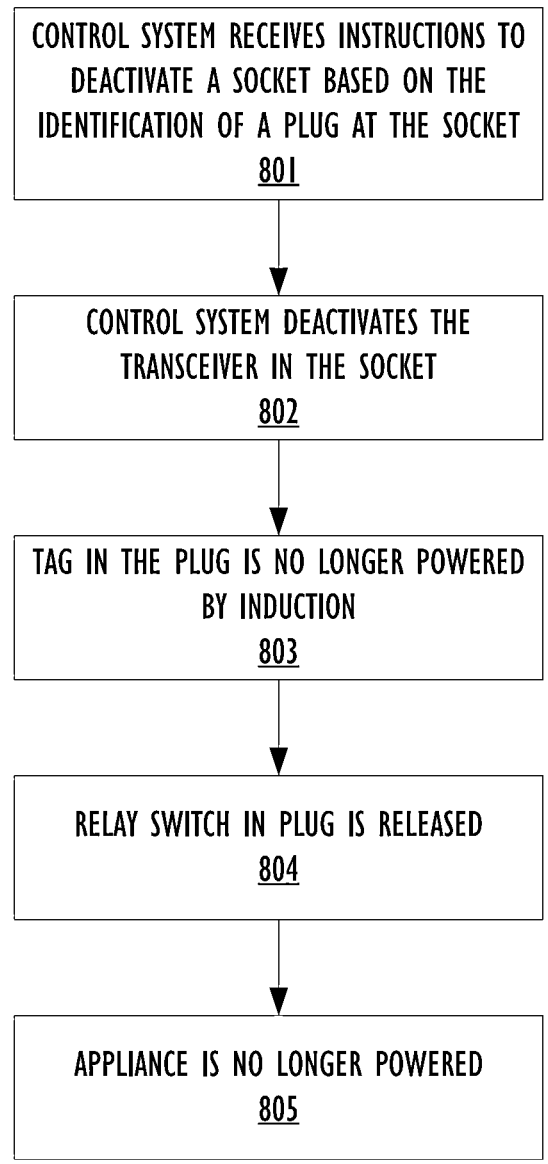
FIG. 8 is a flow diagram of a method for depowering an appliance according to an embodiment of the present disclosure.

Referring now to FIG. 8, there is illustrated a flow diagram of a method for depowering an appliance according to an embodiment of the present disclosure. At step 801, a control system receives instructions to deactivate a socket that is identified based on an identification of a plug. At step 802 the control system remotely deactivates the transceiver in the socket. The deactivation of the transceiver cuts the supply of power (provided by induction) to the tag in the plug (step 803). In response to the tag losing power from the transceiver, power can no longer be supplied from the tag to the relay switch and the relay switch is opened (step 804). In response to the relay switch opening, the flow of power to the appliance is cut and the appliance is de-powered (step 805).

Figure 9:
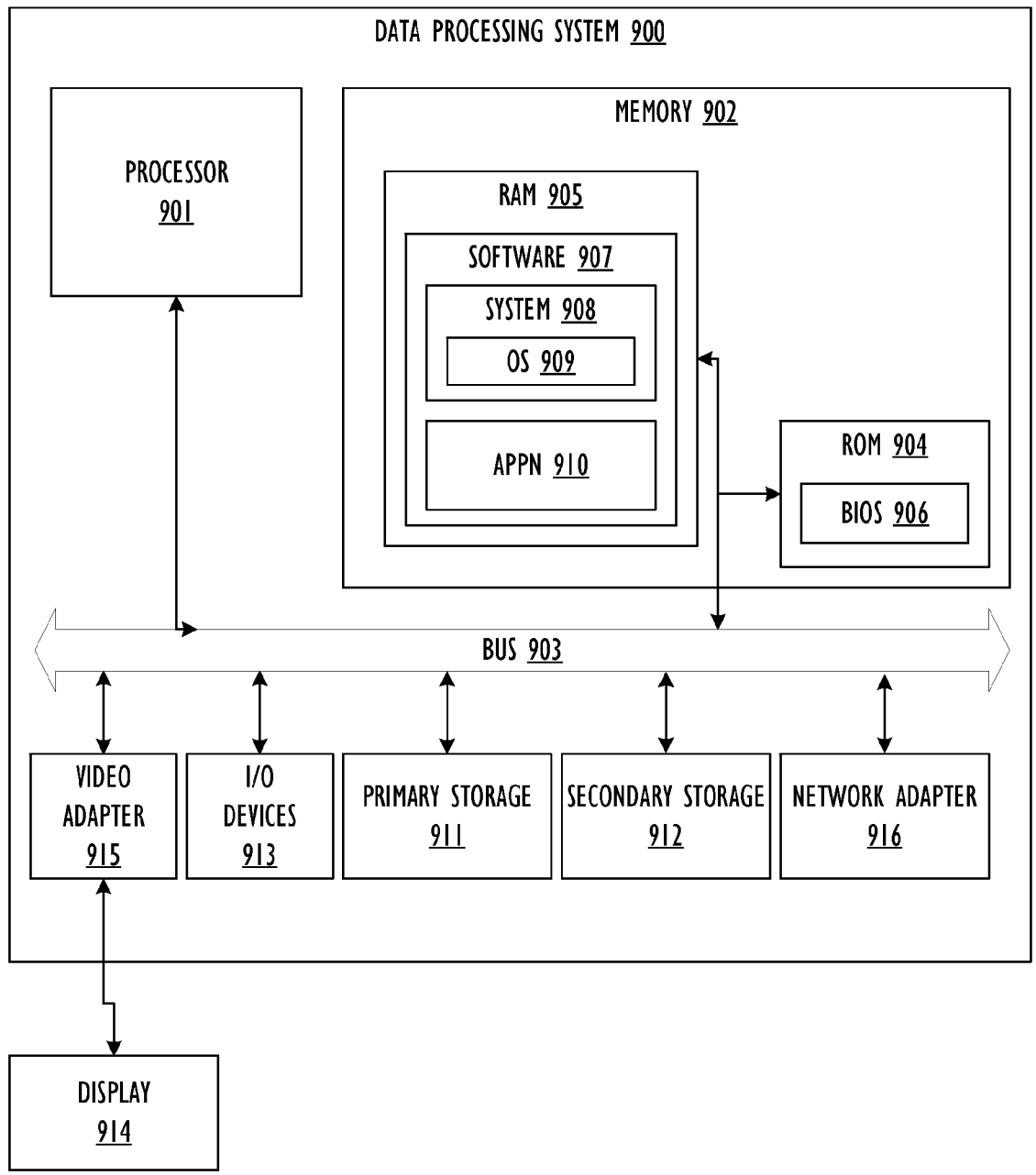
FIG. 9 is a block diagram of an exemplary control system according to an embodiment of the present disclosure.

Referring now to FIG. 9, there is illustrated is a block diagram of an exemplary control system implemented as a data processing system according to an embodiment of the present disclosure. Data processing system 900 is suitable for storing and/or executing program code via at least one processor 901 which is coupled directly or indirectly to memory 902 through a bus system 903. Memory 902 may include local memory employed during actual execution of the program code, bulk storage, and cache memories which provide temporary storage of at least some program code in order to reduce the number of times code must be retrieved from bulk storage during execution. Memory 902 may further include read only memory (ROM) 904 and random access memory (RAM) 905. A basic input/output system (BIOS) 906 may be stored in ROM 904. Software 907, which may further include system software 907 (which may further include an operating system (OS) 908) and software applications 910, may also be stored in RAM 905.

Data processing system 900 may also include a primary storage 911, such as a magnetic hard disk drive, and a secondary storage 912, such as a magnetic disc drive and/or an optical disc drive. These drives and their associated computer-readable media provide non-volatile storage of computer-executable instructions, data structures, program modules and other data for data processing system 900. In one embodiment, software 907 may also be stored on the primary storage 911 and secondary storage 912.

Data processing system 900 may operate in a networked environment using logical connections to one or more remote computers via a network adapter 916. Input/output (I/O) devices 913 may be coupled to data processing system 900 either directly or through other intervening I/O controllers (not pictured). A user may enter commands and information into data processing system 900 through input devices such as a keyboard, pointing device, or other input devices (for example, microphone, joy stick, game pad, satellite dish, scanner, or the like). Output devices may include speakers, printers, etc. Display 914 is also connected to bus 903 via an interface, such as video adapter 915.

In one embodiment, the system described herein uses tags in plugs for both detection and power management. When a tag in a plug is within close proximity to a transceiver in a socket, the tag is powered via induction, and transmits its unique identifier to the control system, thus identifying to the control system which appliance is plugged into that socket. When the tag is being powered the tag allows current to flow through the appliance, thus allowing the device to be used. To turn off the end appliance, the user can remotely turn off the transceiver in the socket, which breaks the circuit between the appliance and the power supply and thus prevents the tag being powered. A relay may be provided in the plug that is controllable by the tag depending on whether or not the tag is being interrogated by a transceiver. The system can further detect which appliances are plugged into which sockets in the environment (which may be a home or commercial environment). The system allows the user to remotely turn devices on and off, from a remote control system such as a web portal. The system further provides assurance to the user that appliances are turned off/on without having to manually check each individual appliance. Since devices may be remotely switched on/off, devices may be powered on only when needed, which results in significant energy savings. Wireless control of plugs does not result in extra wiring to the plugs. Additionally, control of connected appliances may be enabled at regular times, for example as a daily cycle.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some candidate implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present disclosure may be embodied as an apparatus, method or computer program product. Accordingly, aspects of the present disclosure may take the form of an entirely hardware embodiment, an entirely software embodiment (including, for example, firmware, resident software, microcode) or an embodiment combining software and hardware aspects that may all generally be referred to herein as a "circuit," "module" or "system." It will be understood by those skilled in the art that the apparatus that embodies a part or all of the present disclosure may be a general purpose device having at least one processing unit, a memory, and a software executing on the at least one processing unit that is further configured to provide a part or all of an embodiment of the disclosure. The device may be a single device or a group of devices.

The present disclosure can take the form of a computer program product accessible from a computer-usable or computer-readable storage medium providing program code for use by or in connection with a computer or any instruction execution system. For the purposes of this disclosure, a computer usable or computer-readable storage medium can be any tangible apparatus that contains, stores, communicates, propagates, or transports the program for use by or in connection with the instruction execution system, apparatus, or device. The medium can be an electronic, magnetic, optical, electromagnetic, or semiconductor system (or apparatus or device). Examples of a computer-readable storage medium/device include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD. Program code embodied on a computer-readable storage medium may be transmitted using any appropriate medium, including, but not limited to wireless, wireline, optical fiber cable, RF, or any suitable combination of the foregoing.

While the present disclosure has been described with reference to exemplary embodiments, and while the embodiments have been described in considerable detail, it will be understood by those skilled in the art that various changes may be made and equivalents may be substituted for elements thereof without departing from the scope of the invention. Additional advantages and modifications will readily appear to those skilled in the art. The description of the present invention has been presented for purposes of illustration and description, but is not intended to be exhaustive or limited to the invention in the form disclosed. Many improvements, modifications, and variations will be apparent to those of ordinary skill in the art without departing from the scope and spirit of the present disclosure. In addition, many modifications may be made to adapt a particular system, device or component thereof to the teachings of the invention without departing from the essential scope thereof. The embodiment was chosen and described in order to best explain the principles of the invention and the practical application, and to enable others of ordinary skill in the art to understand the invention for various embodiments with various modifications as are suited to the particular use contemplated. Therefore, it is intended that the invention not be limited to the particular embodiments disclosed for carrying out this invention, but that the invention will include all embodiments falling within the scope of the appended claims.

What is claimed is:

1. A control system for remotely controlling a supply of power to a plurality of electrical appliances, the system comprising:
   one or more sockets attached to the main power supply, wherein a first electrical appliance of the plurality of electrical appliances is connectable to the main power supply via a first socket of the one or more sockets to which a plug of the first electrical appliance is attached;
   a transceiver located at one of the first socket and the plug of the first electrical appliance, wherein the transceiver is automatically activated responsive to inserting the plug of the first electrical appliance in the first socket, wherein the transceiver is communicatively connected to the control system;
   a tag provided at a second one of the first socket and the plug of the first electrical appliance, wherein the tag is in close proximity to the transceiver and is capable of receiving communication from the transceiver, wherein the tag includes an inductor that is coupled to a first relay switch in one of the first socket and the plug of the first electrical appliance, wherein the first relay switch, when closed, connects the first electrical appliance and the main power supply in series, and wherein the inductor holds the first relay switch closed while the tag is being stimulated by the transceiver; and
   a controller that is communicatively connected to the transceiver and which:
      interrogates, via the transceiver, the tag to determine a unique identifier of the tag, wherein the unique identifier enables the control system to control whether power is applied to the transceiver;
      receives, from the transceiver, the unique identifier of the tag;
      in response to the receiving an instruction to disconnect power to the first electrical appliance, deactivates the transceiver, wherein deactivation of the transceiver deactivates the plug of the first electrical appliance at the first socket and disconnects the main power supply from the first electrical appliance; and
      in response to the control system receiving an instruction to connect power to the first electrical appliance, activates the transceiver, wherein activation of the transceiver stimulates the tag and activates the plug of the first electrical appliance at the first socket to connect the main power supply to the first electrical appliance.

2. The control system of claim 1, wherein:
   the transceiver is powered by the main power supply;
   the plug of the first electrical appliance is powered at the first socket only while the transceiver is active and the plug of the first electrical appliance is attached to the first socket; and
   the tag allows a current to flow through the plug of the first electrical appliance to the first electrical appliance while the tag is stimulated.

3. The control system of claim 1, wherein:
   the first socket further comprises a microcontroller that receives instructions from the control system;
   the microcontroller is coupled to a second relay switch;
   the microcontroller receives instructions from the control system to provide power to the transceiver by closing the second relay switch or disconnect power from the transceiver by opening the second relay switch;
   the microcontroller and the transceiver are connected in series; and
   the microcontroller and the transceiver are wired parallel to a live wire and a neutral wire of the first socket.

4. The control system of claim 3, wherein the microcontroller is communicatively coupled to the control system via a wireless connection.

5. The control system of claim 1, further comprising a web portal having a network connection to each of the one or more sockets.

6. The control system of claim 1, wherein the transceiver and the tag are radio-frequency identification (RFID) devices.

7. The control system of claim 1, wherein the transceiver and the tag are near field communication (NFC) devices.

8. A computer program product comprising:
a non-transitory computer readable storage medium; and
a plurality of instructions on the non-transitory computer readable storage medium that when executed by a processor of a control system, enables the control system to perform the functions of:
automatically activating a transceiver located at a first one of a first socket of one or more sockets connected to a main power supply and a plug of a first electrical appliance of a plurality of electrical appliances, wherein the transceiver is automatically activated responsive to inserting the plug of the first electrical appliance in the first socket, wherein the transceiver is communicatively connected to the control system;
stimulating, via the transceiver, a tag located at a second one of the first socket and the plug of the first electrical appliance, wherein the tag is in close proximity to the transceiver and is capable of receiving communication from the transceiver, wherein the tag includes an inductor that is coupled to a first relay switch in one of the first socket and the plug of the first electrical appliance, wherein the first relay switch, when closed, connects the first electrical appliance and the main power supply in series, and wherein the inductor holds the first relay switch closed while the tag is being stimulated by the transceiver;
interrogating, via the transceiver, the tag to determine a unique identifier of the tag, wherein the unique identifier enables the control system to control whether power is applied to the transceiver;
receiving, from the transceiver, the unique identifier of the tag;
in response to receiving an instruction to disconnect power to the first electrical appliance, deactivating the transceiver, wherein deactivation of the transceiver deactivates the plug of the first electrical appliance at the first socket and disconnects the main power supply from the first electrical appliance; and
in response to receiving an instruction to connect power to the first electrical appliance, activating the transceiver, wherein activation of the transceiver stimulates the tag, activates the plug of the first electrical appliance at the first socket to interconnect the main power supply and the first electrical appliance.

9. The computer program product of claim 8, wherein:
the transceiver is powered by the main power supply;
the plug of the first electrical appliance is powered at the first socket only while the transceiver is active and the plug of the first electrical appliance is attached to the first socket; and
the tag allows a current to flow through the plug of the first electrical appliance to the first electrical appliance while the tag is stimulated.

10. The computer program product of claim 8, wherein:
the first socket further comprises a microcontroller that receives instructions from the control system;
the microcontroller is communicatively coupled to the control system via a wireless connection;
the microcontroller is coupled to a second relay switch;
the microcontroller receives instructions from the control system to provide power to the transceiver by closing the second relay switch or disconnect power from the transceiver by opening the second relay switch;
the microcontroller and the transceiver are connected in series; and
the microcontroller and the transceiver are wired parallel to a live wire and a neutral wire of the first socket.

11. The computer program product of claim 8, wherein the control system further comprises a web portal having a network connection to each of the one or more sockets.

12. The computer program product of claim 8, wherein the transceiver and the tag are one of: radio-frequency identification (RFID) devices and near field communication (NFC) devices.

13. The control system of claim 1, wherein the transceiver is located at the plug of the first electrical appliance and the tag is located at the first socket.

14. The computer program product of claim 8, wherein the transceiver is located at the plug of the first electrical appliance and the tag is located at the first socket.

15. The control system of claim 1, wherein:
the tag is located at the plug of the first electrical appliance and the transceiver is located at the first socket;
the first relay switch is located in a live voltage path between the main power supply and a live voltage contact at the first socket; and
the first relay switch is opened in response to the tag no longer being stimulated by the transceiver, which removes a voltage provided by the main power supply to the live voltage contact at the first socket.

16. The computer program product of claim 8, wherein:
the tag is located at the plug of the first electrical appliance and the transceiver is located at the first socket;
the first relay switch is located in a live voltage path between the main power supply and a live voltage contact at the first socket; and
the first relay switch is opened in response to the tag no longer being stimulated by the transceiver, which removes a voltage provided by the main power supply to the live voltage contact at the first socket.

* * * * *